Oct. 24, 1944. W. H. TRESS ET AL 2,360,911
NAVIGATIONAL PLOTTER
Filed Feb. 4, 1941 2 Sheets-Sheet 1

INVENTOR
William H. Tress
BY Orville M. Deming
ATTORNEY

Oct. 24, 1944.     W. H. TRESS ET AL     2,360,911
NAVIGATIONAL PLOTTER
Filed Feb. 4, 1941     2 Sheets-Sheet 2

INVENTOR
William H. Tress
BY Orville M. Deming
ATTORNEY

Patented Oct. 24, 1944

2,360,911

UNITED STATES PATENT OFFICE 2,360,911

NAVIGATIONAL PLOTTER

William H. Tress and Orville M. Deming,
Washington, D. C.

Application February 4, 1941, Serial No. 377,316

7 Claims. (Cl. 33—109)

(Granted under the act of March 3, 1883, as
amended April 30, 1928; 370 O. G. 757)

This invention relates to a navigational plotter comprising a roller type parallel rule combined with a protractor and so arranged as to facilitate the rapid and accurate drawing of parallel lines and angles.

It is the primary object of this invention to provide a plotter which will perform most of the functions of the universal drafting machine, with ease, rapidity and accuracy, and yet will occupy much less space, be much more inexpensive to construct, require no connection to a table or other rigid support and be readily usable in places where the use of the universal drafting machine is impracticable.

It is a further object of this invention to provide a plotting instrument which will facilitate the accurate drawing of bearing lines much longer than the dimensions of its parts.

It is another object of this invention to provide an instrument which will, in effect, embody a movable compass rose, and thus obviate the necessity for moving back and forth to a compass rose on the chart when plotting a plurality of courses and bearings.

It is still another object of this invention to provide a plotting instrument which is quickly and accurately rotatable about a point through 360° of azimuth, and having a protractor bearing degree indications extending in a counter-clockwise manner in order to facilitate the laying off from that point of any bearing line through the full azimuth.

It is a still further object of this invention to provide a navigational plotting instrument comprising a parallel rule combined with a protractor in such a manner that the two components may be easily separated for the separate use of each one.

Referring now to the drawings.

Figure 1:
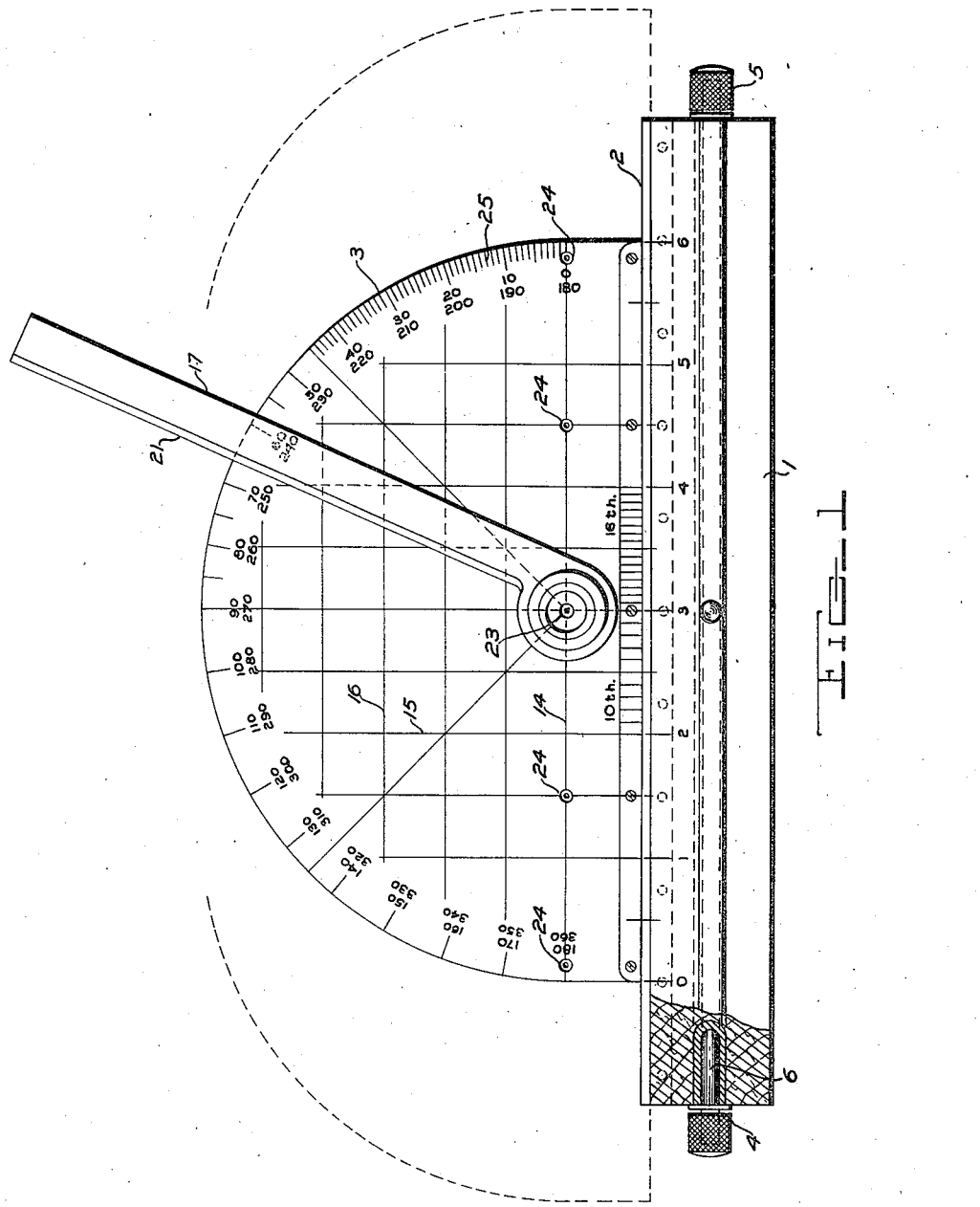
Fig. 1 is a plan view of a navigational plotter constructed according to the invention.
Figure 2:
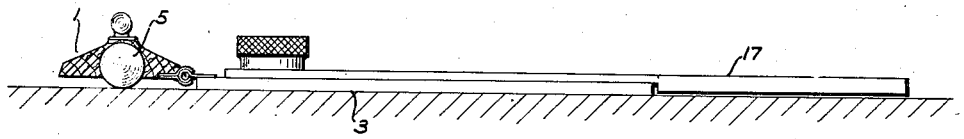
Fig. 2 is an elevational view of the plotter as shown in Fig. 1.

The reference numeral 1 indicates a parallel rule of the roller type, along one longitudinal edge 2 of which is slidably mounted a semi-circular protractor 3. The rule is of the conventional roller type having two rollers 4 and 5 positioned at its opposite ends and connected by a roller link shaft 6 extending longitudinally through the center of the ruler. The shaft 6 is freely rotatable in a snug-fitting bearing extending the full length of the rule.

Figure 3:
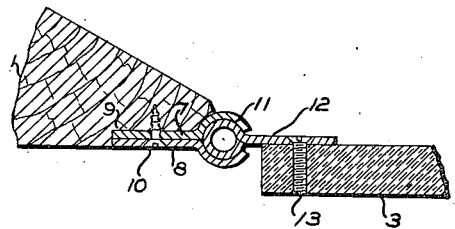
Fig. 3 is an enlarged sectional view of a fragment of the plotter showing the details of the connection between the protractor and the rule.

The details of the joint between the rule and the protractor are best shown in Fig. 3. In this figure it will be noted that the joint is formed by means of two plates 7 and 8 having curved outer edges and being secured together and to the face of a recess 9 in ruler 1 by screws 10 and forming between their outer edges a partial cylindrical recess 11 extending the full length of the edge of the ruler. Into this circular recess is fitted the roll edged slide rail 12 which is secured to the edge of protractor 3 by bolts 13. It will be noted that a gap is left between the outer edges of the plates 7 and 8 which permits substantial angular movement of the protractor with respect to the rule about the axis of slide rail 11. The purpose of the gap is to allow a slight amount of articulation between the protractor and the ruler so that when the plotter is being used to extend a line by the alternate sliding of the protractor and the ruler in parallelism with their mating edges, there will be no binding in the joint.

Figure 4:
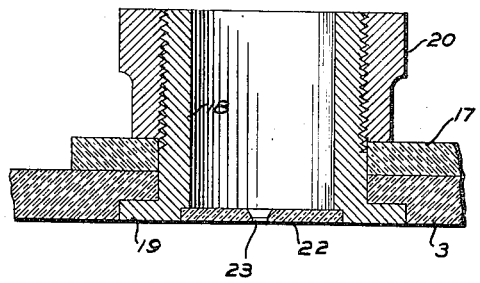
Fig. 4 is an elevational view in section of the joint connecting the arm to the protractor.

The base line 14 of the protractor is spaced from and parallel to the edge 2 of the rule. Along the semi-circular edge of the protractor is formed a degree scale 25. The series of degree designations nearest the edge of the protractor read from zero° to 180° in a counter-clockwise manner and the inner series of designations read from 180° to 360° in a counter-clockwise manner. The protractor is preferably made of transparent material and has inscribed on its lower face a series of grid lines 15 and 16. Other lines and inscriptions may of course be added as desired, to facilitate the use of the protractor. An arm 17 is pivotally mounted for radial movement about the center of the protractor by mounting means best illustrated in Fig. 4. The cylindrical thimble 18 having a head 19 and having screw threads formed on its outer surface, is secured in a hole passing through protractor 3 and arm 17 by means of a knurled nut 20 which is threaded thereon and which may be used to secure the arm 17 in any desired angular setting or may be left loose to permit free rotation of the arm. The arm is so shaped that one of its parallel edges 21 extends radially from the center point of the protractor. A transparent plate 22 having a hole 23 large enough to admit the point of a pencil is secured in the bottom of thimble 18. The thimble 18 is large enough to allow a pencil to be thrust therethrough.

The edge 2 of the rule 1 is graduated in any desired scale of linear measurement and the abutting edge of the protractor is provided with a similar scale. The base line of the protractor is provided with holes 24 large enough to admit the point of a pencil, these holes being preferably located at intersections of the grid lines formed on the lower surface of the protractor.

The plotter has many uses. It may be quickly and easily separated into its two component parts by merely sliding the protractor until it is disengaged from the joint. When used as a single instrument it may be used to plot parallel lines in the normal manner, this being facilitated by the holes 23 and 24, since the rule may be held in a fixed position on the chart with one hand and a pencil point inserted in one of the holes may be used to slide the protractor along the edge of the rule and thus generate a straight line. The length of such line may be quickly and accurately increased by first sliding the protractor with respect to the rule, then holding the protractor in place on the chart and sliding the rule relative to the protractor. By this means a line may be prolonged indefinitely and with accuracy. By the use of arm 17 a line extending at any desired angle from the base line of the protractor or a line drawn as described above may be plotted or the angle measured.

In running bearing lines from a given point on a chart the instrument should first be squared with respect to the latitude and longitude lines of the chart after which it may be rolled and slid into position with the hole 23 directly over the selected point of the chart. The location of the 90° designation of the protractor's scale may now be marked on the chart and this will serve to locate a reference point on the meridian passing through the point. Now by thrusting a pencil point through the hole 23 and holding it there the protractor may be rotated until the degree designation on the scale corresponding to the desired bearing is in alignment with the mark just made on the chart. By holding the rule in place on the chart the desired bearing line may be drawn by thrusting a pencil point through any of the holes 24 or 23 and simultaneously sliding the protractor and pencil along the rule. If it is desired to draw other bearing lines from the same point, it is necessary only to bring the hole 23 back over the point on the chart and re-rotate the protractor until the degree designation corresponding to the ensuing bearing is brought in alignment with the original mark made on the chart. The ensuing bearing may now be drawn in the same manner as the first. It is thus apparent that any desired number of bearing lines radiating from a single point may be rapidly plotted once the meridian through the point is established, without reference to the compass rose on the chart.

This instrument is adaptable to a variety of navigational work such as plotting courses, lines of position and for use on mooring and maneuvering boards and strategic plotting sheets. It will accurately perform most of the functions of a universal drafting machine while requiring only a fraction of the space and obviating the necessity for a rigid connection to a fixed supporting means. It is obviously much less expensive to construct and maintain.

While primarily intended for navigational plotting, this instrument should also prove of value in connection with all types of drafting work and will often be found more convenient, useful and economical than the conventional T square and triangles or universal drafting machine for these uses. It is especially adapted for use in connection with isometric drawings which show objects in three planes and at definite angles to each other. It would also be of value in making enlargements or reductions of drawings. For this purpose relative lines of the original can be transferred to the reproduction in true bearing and the relative lengths of lines marked off without removing the pencil from the holes, by using the scales of measurements provided along the abutting edges of the rule and protractor. This use, by obviating the necessity of interchanging instruments with which to measure lines and angles and the erasing of base lines, will save much time.

The plotter will also be found to be of use in lettering. It may, for example, be used in sketching slope, spacing, or in the laying out of block type letters direct.

In accordance with the patent statutes, we have set forth what we now consider to be the best embodiment of the invention. However, it is to be understood that the scope of the invention is not to be restricted by this disclosure but only by the scope and limitations of the appended claims.

The invention described herein may be manufactured and/or used by or for the Government of the United States of America for governmental purposes without the payment of any royalties thereon or therefor.

We claim:

1. A navigational plotter comprising a parallel ruler, a semi-circular transparent protractor and means joining said ruler and said protractor together edge to edge in a manner to allow both free parallel sliding movement therebetween and motion of said protractor about an axis parallel with the edge of said ruler to which said protractor is joined.

2. A navigational plotter as claimed in claim 1 characterized in that said protractor is marked along its semi-circular edge in degrees and their reciprocals, said markings extending in a counter-clockwise manner.

3. A navigational plotter as claimed in claim 1 characterized in that said protractor has formed therein a series of pencil holes extending parallel to its base edge, one of said holes being located along the axis of symmetry of said protractor.

4. A navigational plotter comprising a parallel ruler and a semi-circular transparent protractor, said ruler and protractor being joined along their mating edges in a manner to permit both free parallel sliding motion therebetween and motion of said protractor about an axis parallel with the edge of said ruler to which said protractor is joined, said protractor having inscribed along its semi-circular edge a scale of azimuthal degrees and their reciprocals extending in a counter-clockwise manner therealong, a series of pencil holes formed in said protractor along a line extending parallel to said mating edges, one of said holes being formed along the axis of symmetry of said protractor, whereby a pencil point thrust through one of said holes will form an axis about which said plotter as a unit may be revolved in azimuth thereby facilitating the laying off of lines of bearing and courses on a chart and substantially eliminating for this purpose the necessity for the use of a compass rose inscribed on said chart.

5. A navigational plotter, comprising a parallel ruler of the roller type having an edge parallel to the axis of its rollers, a member, means joining said member to said ruler along said edge in a manner to render said member freely slidable along said edge and to permit articulation of said member about an axis parallel to said edge, said member being formed with a hole of a size to admit and snugly surround the point of a pencil thrust therethrough from above, the degree of freedom for sliding movement between said member and said ruler afforded by said joining means being such that said member may be propelled in such movement along a supporting surface by the lateral pressure of said pencil point.

6. A navigational plotter comprising a parallel rule and a protractor joined thereto in a manner to render it freely slidable along one edge thereof and for movement about an axis parallel to said edge.

7. A navigational plotter, comprising a parallel rule, a semi-circular protractor joined thereto in a manner to render it freely slidable along one edge thereof and for movement about an axis parallel to said edge, a degree scale formed along the semi-circular edge of said protractor, said scale being provided with degree designations running in a counter-clockwise direction from 0° to 180° and with reciprocals of said designations, said protractor being formed of transparent material, and grid lines formed on said protractor, said grid lines extending parallel to and normal to a line determined by the 90° designation of said scale and the center point of said protractor, said protractor having formed therein a series of holes of a size to allow a pencil point to be thrust therethrough, said holes being located along the base line of said protractor at intersections of said line with said grid lines.

WILLIAM H. TRESS.
ORVILLE M. DEMING.